US011585681B2

(12) United States Patent
MacDonald et al.

(10) Patent No.: US 11,585,681 B2
(45) Date of Patent: Feb. 21, 2023

(54) VIBRATING ELEMENT APPARATUS

(71) Applicant: Rosemount Measurement Limited, Berkshire (GB)

(72) Inventors: George Alexander MacDonald, Berkshire (GB); Jonathan James Goff, Surrey (GB)

(73) Assignee: Rosemount Measurement Limited, Berkshire (GB)

( * ) Notice: Subject to any disclaimer, the term of this patent is extended or adjusted under 35 U.S.C. 154(b) by 348 days.

(21) Appl. No.: 16/494,399

(22) PCT Filed: Mar. 16, 2018

(86) PCT No.: PCT/GB2018/050696
§ 371 (c)(1),
(2) Date: Sep. 16, 2019

(87) PCT Pub. No.: WO2018/167516
PCT Pub. Date: Sep. 20, 2018

(65) Prior Publication Data
US 2020/0225064 A1 Jul. 16, 2020

(30) Foreign Application Priority Data
Mar. 16, 2017 (GB) ..................... 1704229

(51) Int. Cl.
*G01D 5/243* (2006.01)
*G01D 5/42* (2006.01)
(Continued)

(52) U.S. Cl.
CPC ............ *G01D 5/243* (2013.01); *G01D 5/425* (2013.01); *G01F 23/296* (2013.01);
(Continued)

(58) Field of Classification Search
CPC .......... G01D 5/243; G01D 5/425; G01D 5/48; G01F 23/0069; G01F 23/296;
(Continued)

(56) References Cited

U.S. PATENT DOCUMENTS 2,144,950 A * 1/1939 Wiessner ............... H04H 20/81
333/167
4,751,479 A * 6/1988 Parr ...................... H03H 1/0007
333/12
(Continued)

FOREIGN PATENT DOCUMENTS

CN 104237891 12/2014
DE 10 2015 101891 8/2016
(Continued)

OTHER PUBLICATIONS

UKIPO Search Report from Application No. GB1704229.2, dated Aug. 29, 2017.
(Continued)

*Primary Examiner* — Alexander Satanovsky
(74) *Attorney, Agent, or Firm* — The Ollila Law Group LLC

(57) ABSTRACT

The invention provides a method of driving a vibrating sensor in which the drive signal is combined with an amplitude modulated high frequency carrier. The signal is demodulated at a position adjacent to the component to be driven. This method may be applied to reducing cross-talk between drive and pick-up wire pairs and also to passing both drive and pickup signals, and two drive signals, down the same wire pair.

10 Claims, 2 Drawing Sheets

(51) Int. Cl.
  *G01F 23/296* (2022.01)
  *G01H 3/08* (2006.01)
  *G01N 9/00* (2006.01)
  *G01N 11/16* (2006.01)
  *G01F 23/80* (2022.01)

(52) U.S. Cl.
  CPC .............. *G01F 23/802* (2022.01); *G01H 3/08* (2013.01); *G01N 9/002* (2013.01); *G01N 11/16* (2013.01); *G01N 2009/006* (2013.01)

(58) Field of Classification Search
  CPC ........ G01F 23/2967; G01H 3/08; G01H 3/00; G01N 9/002; G01N 11/16; G01N 2009/006
  See application file for complete search history.

(56) References Cited

U.S. PATENT DOCUMENTS

| | | | | |
|---|---|---|---|---|
| 5,065,133 | A * | 11/1991 | Howard | H04L 25/03127 375/258 |
| 5,615,065 | A * | 3/1997 | Cheung | G11B 5/59622 360/77.08 |
| 5,980,461 | A * | 11/1999 | Rajan | G01S 15/8906 600/459 |
| 2005/0093173 | A1 * | 5/2005 | Miller | H01L 23/49838 257/780 |
| 2016/0223497 | A1 * | 8/2016 | Joshi | G01F 1/667 |
| 2018/0024097 | A1 * | 1/2018 | D'Angelico | G01N 29/024 73/32 A |

FOREIGN PATENT DOCUMENTS

| | | |
|---|---|---|
| GB | 2 352 931 | 7/2001 |
| JP | 2007-139642 | 6/2007 |
| JP | 2010-256136 | 11/2010 |
| SU | 590608 | 1/1978 |

OTHER PUBLICATIONS

International Search Report from International Application No. PCT/GB2018/050696, dated Jun. 18, 2018.
Written Opinion of the International Searching Authority from International Application No. PCT/GB2018/050696, dated Jun. 18, 2018.

* cited by examiner

VIBRATING ELEMENT APPARATUS

CROSS-REFERENCE TO RELATED APPLICATION

This Application is a Section 371 National Stage Application of International Application No. PCT/GB2018/050696, filed Mar. 16, 2018 and published as WO 2018/167516 on Sep. 20, 2018, in English, which claims priority to GB Application No. 1704229.2, filed Mar. 16, 2017, the contents of which are hereby incorporated by reference in their entirety.

FIELD OF THE INVENTION

This invention relates to apparatus incorporating a vibrating transducer and, in particular, to methods of driving this form of apparatus. Such forms of apparatus include, but are not necessarily limited to, instruments for measuring level, density and viscosity.

BACKGROUND TO THE INVENTION

Vibrating element instruments for measuring flow, level, density and viscosity are well known. These instruments operate by applying a drive signal of known characteristics to a vibrating element, and then receiving and processing a signal from the vibrating element. The received signal varies according to changes in the environment in contact with the vibrating element and can thus be processed to give a measure of mass flow, density and viscosity through or in contact with the instrument; or whether there is a change of environment in contact with the vibrating element.

A common example of a vibrating element apparatus to which this invention may be applied is a tuning fork level switch.

Certain applications of this general type of instrument are configured such that the drive and receive or pick-up transducer(s) are spaced a significant distance from the drive and processing electronics, necessitating the use of long cables to link the two. In such applications cross-talk can arise between the large amplitude drive signal and the significantly smaller amplitude pick-up signal at the same frequency. Presently this problem is addressed by using screened cable to isolate the pick-up signal from the drive signal, but such cabling adds cost both in terms of material and in the time taken to effect the connections at both ends of the cable.

It is an object of the present invention to go at least some way in addressing the above-mentioned drawback; or to at least provide a method and/or apparatus applicable to a vibrating element apparatus, which will provide a novel and useful alternative.

SUMMARY OF THE INVENTION

Accordingly, in one aspect, the invention provides a method of driving a vibrating sensor, said sensor having a vibrating element; and drive and signal processing electronics spaced from said vibrating element, wherein said method comprises transmitting a signal to excite said vibrating element as an amplitude modulated high frequency signal, and demodulating said signal close to said vibrating element.

Preferably said method is applied to driving a vibrating sensor in which the drive and processing electronics are connected to the vibrating element by un-screened cable.

Said method may be applied to driving two vibrating elements from a single pair of wires, one drive signal being transmitted as a low frequency signal and one signal being transmitted as an amplitude modulated signal on a high frequency carrier.

Preferably said method comprises demodulating the high frequency signal using discrete non-active components.

Preferably said non-active components include one or more resistors, capacitors and rectifying diodes.

In a second aspect the invention provides a vibrating sensor, said sensor having a vibrating element; and drive and signal processing electronics spaced from said vibrating element said drive and signal processing electronics being operable to transmit a drive signal to excite said vibrating element, and to receive a pick-up signal from said vibrating element, wherein said electronics is operable to transmit said drive signal as an amplitude modulated high frequency signal, said sensor further including a demodulating facility to de-modulate said drive signal close to said vibrating element.

Preferably said drive signal is transmitted from said drive and signal processing electronics to said vibrating element by un-screened cable.

Said sensor may include two vibrating elements driven from a single pair of wires, said drive and processing electronics being configured to transmit one drive signal as a low frequency signal and to transmit the other drive signal as an amplitude modulated signal on a high frequency carrier.

Preferably said demodulating facility comprises discrete non-active components.

Preferably said non-active components include one or more resistors, capacitors and rectifying diodes.

Many variations in the way the invention may be performed will present themselves to those skilled in the art, upon reading the following description. The description should not be regarded as limiting but rather as an illustration, only, of one manner of performing the invention. Where appropriate any element or component should be taken as including any or all equivalents thereof whether or not specifically mentioned.

BRIEF DESCRIPTION OF THE DRAWINGS

Various aspects of the invention will now be described with reference to the accompanying drawings in which.

DETAILED DESCRIPTION OF WORKING EMBODIMENT

Figure 1:
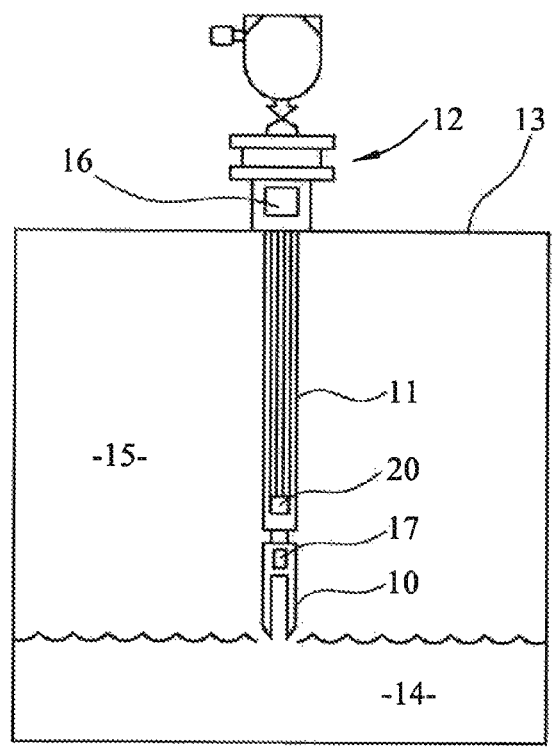
FIG. 1: shows a part sectional diagrammatic view of a vibrating fork instrument incorporating the invention.

Referring firstly to FIG. 1, a vibrating element sensor is shown in the form of a vibrating fork 10 mounted on the end of a long stem 11. The stem 11 extends from sensor body 12 that, in turn, is mounted on tank 13 containing a liquid medium 14 and a gaseous medium 15, the latter typically being air. Drive and processing electronics indicated schematically at 16 create a drive signal to vibrate the fork and also process the pick-up signal received from the fork. Adjacent to the fork are piezo transducer elements 17, one of which converts the drive signal into a mechanical force to vibrate the fork, and the other of which converts the resultant mechanical displacement of the fork into a pick-up signal that is returned to the electronics 16 for processing. The piezo elements 17 are connected to the electronics 16 in a manner that will be discussed in greater detail below.

As is well known the pick-up signal will vary depending on whether or not the fork 10 is in contact with the liquid medium 14 or is in contact with the gaseous medium 15.

Figure 2:
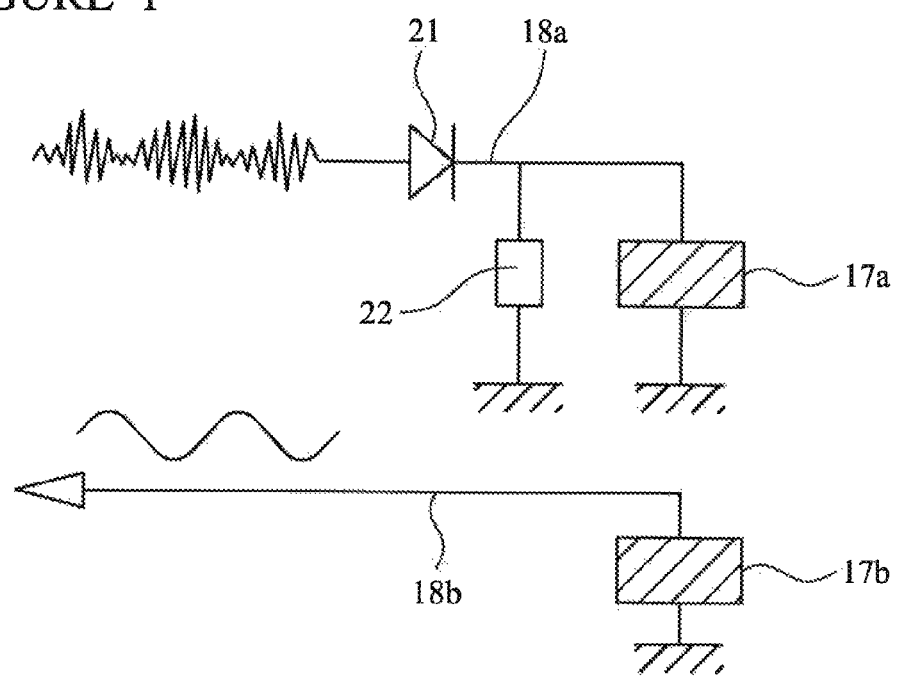
FIG. 2: shows a first circuit diagram for driving and processing signals in the apparatus of FIG. 1.

Turning now to FIG. 2, the drive piezo element 17a is connected to the electronics 16 by a wire pair 18a while the pickup element 17b is connected to the electronics by a wire pair 18b. Conventionally, and particularly in the case of long stem vibrating forks, cross-talk between the wires 18a and 18b is a known problem and the respective wires must be well screened from one another to avoid this problem. However the use of screened cables is expensive in itself and further expense is incurred in installing screened cable.

The present invention addresses this shortcoming by configuring the electronics 16 to combine a conventional drive signal with an amplitude modulated high frequency carrier. The drive signal is demodulated close to the drive piezo element 17a and, as a result, the drive and pick-up signals passing along cables 18a and 18b are at significantly different frequencies and cross-talk between the two is no longer a problem even when the wire pairs 18a and 18b are unscreened.

Demodulation of the excitation signal is preferably effected using readily available, low cost, discrete non-active components indicated schematically by 20 in FIG. 1. In the form shown in FIG. 2, demodulation is effected using a rectifying diode 21 and a resistor 22 and also makes use of the capacitor-like property of the piezo element 17A. Other embodiments may include one or more filters, resistors, capacitors and rectifying diodes, the precise form of which will depend on the particular application and will be readily determinable by those skilled in the art.

Figure 3:
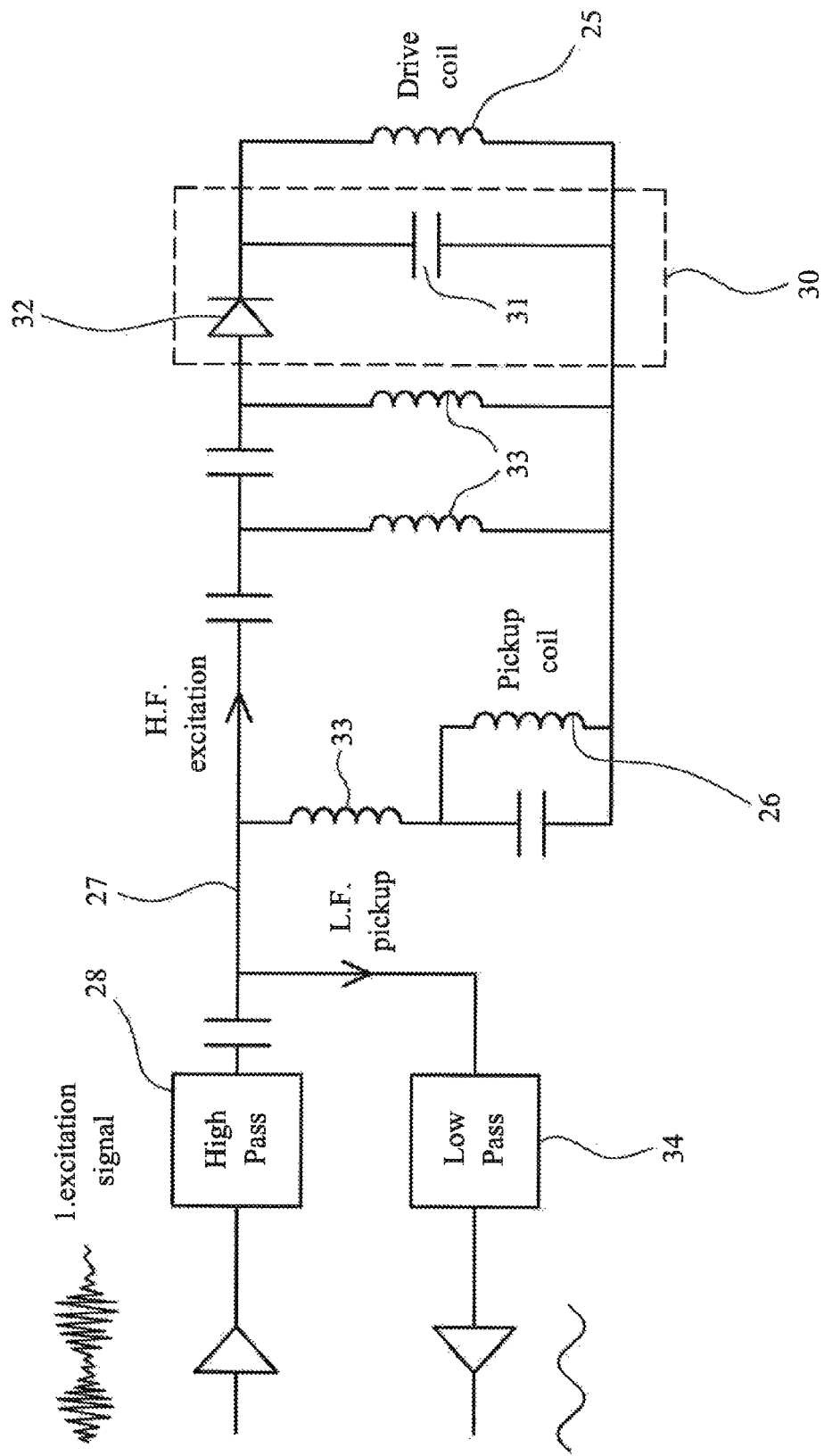
FIG. 3: shows an alternative circuit diagram for driving and processing signals in the apparatus of Figure.

Turning now to FIG. 3, the same principles may be applied to a vibrating instrument incorporating an electromagnetic drive coil 25 and an electromagnetic pick-up coil 26 wherein the drive and pickup signals are passed through a single wire pair 27. The drive signal is at a high frequency and, by the nature of the vibrating instrument, the pick-up signal will be at a low frequency. As will be apparent from the description that follows, these signals can co-exist on the same wire pair 27 and by the use of appropriate high and low pass filter components, can be directed independently to and from the drive and pick-up circuitry.

In the form shown, a high frequency carrier wave of, for example, 500 kHz, is amplitude modulated using an excitation signal of 1 kHz. The signal is passed through a high pass filter 28 and then, adjacent to the drive coil 25, is passed into a demodulation facility being the components surrounded by dotted line 30. As shown these comprise capacitors 31 and a rectifying diode 32, these passive components being configured so that an excitation of frequency 1 kHz is applied to drive coil 25. The excitation of the drive coil 25 generates an alternating force that causes the instrument to vibrate and, due to the resultant vibration, an alternating signal is generated in the pick-up coil 26. This alternating signal can be passed back down the wire pair 27 and passed through low pass filter 34 to effect separation from the drive signal.

Also shown in FIG. 3 are a series of inductors 33, these being configured to prevent interference by the drive signal on the pick-up signal.

It will thus be appreciated that the invention provides a simple yet effective method of separating drive and pick-up signals, between a processor and a transducer, into distinctly different frequencies and, in so doing, eliminates the problem of cross-talk. By way of example, the method described with reference to FIG. 2 has been shown to be effective using unscreened cable between processor and sensor over a distance of 7 metres but is by no means limited to this distance.

What is claimed is:

1. A method of driving a vibrating sensor for a vibratory fluid meter that reduces cross talk between an excitation signal and a pick up signal, said sensor having a vibrating element; and drive and signal processing electronics spaced from said vibrating element, wherein said method comprises transmitting a signal to excite said vibrating element as an amplitude modulated high frequency signal, said sensor further including a demodulating facility that de-modulates said drive signal by separating the excitation signal from a carrier signal, and providing only the excitation signal to the vibrating element, wherein the demodulating facility is disposed on a distal portion of a submersible stem and disposed proximate the vibrating element, wherein the vibrating element is disposed on the distal portion of a submersible stem.

2. A method as claimed in claim 1 when applied to driving a vibrating sensor in which the drive and processing electronics are connected to the vibrating element by un-screened cable.

3. A method as claimed in claim 1 when applied to driving a fork comprising two vibrating elements from a single pair of wires, one drive signal being transmitted as a low frequency signal and one signal being transmitted as an amplitude modulated signal on a high frequency carrier.

4. A method as claimed in claim 1 comprising demodulating the high frequency signal using discrete non-active components.

5. A method as claimed in claim 4 wherein said non-active components include one or more resistors, capacitors and rectifying diodes.

6. A vibrating sensor for a vibratory fluid meter that reduces cross talk between an excitation signal and a pick up signal, said sensor having a vibrating element; and drive and signal processing electronics spaced from said vibrating element said drive and signal processing electronics being operable to transmit a drive signal to excite said vibrating element, and to receive a pick-up signal from said vibrating element, wherein said electronics is operable to transmit said drive signal as an amplitude modulated high frequency signal, said sensor further including a demodulating facility to de-modulate said excitation signal, by separating the excitation signal from a carrier signal, and providing the excitation signal to the vibrating element, wherein the demodulating facility is disposed on a distal portion of a submersible stem and disposed proximate the vibrating element, wherein the vibrating element is disposed on the distal portion of a submersible stem.

7. A vibrating sensor as claimed in claim 6 wherein said drive signal is transmitted from said drive and signal processing electronics to said vibrating element by unscreened cable.

8. A vibrating sensor as claimed in claim 6 including two vibrating elements driven from a single pair of wires, said drive and processing electronics being configured to transmit one drive signal as a low frequency signal and to transmit the other drive signal as an amplitude modulated signal on a high frequency carrier.

9. A vibrating sensor as claimed in claim 6 wherein said demodulating facility comprises discrete non-active components.

10. A vibrating sensor as claimed in claim 9 wherein said non-active components include one or more resistors, capacitors and rectifying diodes.

\* \* \* \* \*